US008826806B2

(12) United States Patent
Difante

(10) Patent No.: US 8,826,806 B2
(45) Date of Patent: Sep. 9, 2014

(54) COOKING CONTAINER WITH STRAINER-BASKET

(76) Inventor: Agostino Difante, San Clemente, CA (US)

( * ) Notice: Subject to any disclaimer, the term of this patent is extended or adjusted under 35 U.S.C. 154(b) by 295 days.

(21) Appl. No.: 12/932,357

(22) Filed: Feb. 25, 2011

(65) Prior Publication Data

US 2012/0216683 A1    Aug. 30, 2012

(51) Int. Cl.
*A23B 4/052* (2006.01)
*A47J 37/12* (2006.01)
*B01D 24/02* (2006.01)
*B01D 39/10* (2006.01)
*A47J 27/18* (2006.01)

(52) U.S. Cl.
CPC ........................................ *A47J 27/18* (2013.01)
USPC .................. 99/352; 99/450; 99/403; 99/410; 99/411; 99/412; 99/413; 99/414; 99/415; 99/417; 99/418; 99/408; 210/498; 210/499; 210/483

(58) Field of Classification Search
USPC .................. 99/450, 403, 410–415, 417–418; 210/464–469, 473–477, 244–246
See application file for complete search history.

(56) References Cited

U.S. PATENT DOCUMENTS

| | | | |
|---|---|---|---|
| 1,004,423 A | 9/1911 | Hanlon et al. | |
| 1,238,688 A | 8/1917 | Kinkel | |
| 2,061,533 A * | 11/1936 | Anetsberger | 99/408 |
| 2,064,214 A * | 12/1936 | Merkle | 99/315 |
| 2,132,099 A * | 10/1938 | Doering et al. | 426/491 |
| 2,188,563 A | 1/1940 | Anzalone | |
| 2,307,408 A | 1/1943 | Kent | |
| 2,555,720 A | 6/1951 | Wiegel | |
| 2,576,332 A * | 11/1951 | Derck | 210/250 |
| 2,588,614 A | 3/1952 | Capra | |
| 2,742,849 A * | 4/1956 | Stiglitz | 99/299 |
| 2,753,436 A | 7/1956 | Schwaneke | |
| 2,760,641 A * | 8/1956 | Kracklauer et al. | 210/250 |
| 2,785,277 A | 3/1957 | Jepson | |
| 3,939,760 A * | 2/1976 | Eaton et al. | 99/312 |
| 4,401,017 A | 8/1983 | Feld | |
| 4,555,339 A * | 11/1985 | Graves et al. | 210/244 |
| 4,574,776 A | 3/1986 | Hidle | |
| 4,604,989 A | 8/1986 | Kita | |
| 4,626,352 A | 12/1986 | Massey et al. | |
| 4,688,549 A * | 8/1987 | Blankemeyer et al. | 126/373.1 |
| 5,221,475 A * | 6/1993 | Mealey et al. | 210/474 |
| 5,287,798 A | 2/1994 | Takeda | |
| D349,420 S | 8/1994 | Hasuike | |
| 5,370,042 A * | 12/1994 | Tolchin et al. | 99/417 |

(Continued)

OTHER PUBLICATIONS

Non-Final Office Action Dated Aug. 12, 2013 in U.S. Appl. No. 13/373,639.

(Continued)

*Primary Examiner* — Dana Ross
*Assistant Examiner* — Gyounghyun Bae
(74) *Attorney, Agent, or Firm* — Robert D. Buyan; Stout, Uxa & Buyan, LLP

(57) ABSTRACT

Apparatus for cooking foods such as pasta rice including a container which receives a liquid to be heated and a cooking strainer-basket partially submerged in the liquid for cooking within the container, the container and the basket configured to have cooperating selectively engaging support members for alternatively positioning of the basket in the liquid for cooking of the food and repositioning of the basket above the liquid to provide for straining of the food.

11 Claims, 4 Drawing Sheets

(56) References Cited

U.S. PATENT DOCUMENTS

| | | | |
|---|---|---|---|
| 5,402,714 A | 4/1995 | Deneault et al. | |
| 5,662,026 A | 9/1997 | Prakasa | |
| 5,730,045 A * | 3/1998 | Delaquis et al. | 99/337 |
| 5,826,494 A * | 10/1998 | Wang | 99/340 |
| 5,918,535 A | 7/1999 | Moreau | |
| 6,055,901 A | 5/2000 | Gantos et al. | |
| 6,103,291 A | 8/2000 | Fernandez Tapia | |
| 6,269,737 B1 | 8/2001 | Rigney et al. | |
| 6,314,869 B1 * | 11/2001 | Bourgeois, Jr. | 99/340 |
| 6,446,545 B2 | 9/2002 | Rigney | |
| 6,546,849 B1 | 4/2003 | Shimazaki | |
| 6,568,314 B1 | 5/2003 | Stepanova | |
| 7,021,202 B2 * | 4/2006 | Sizer | 99/415 |
| 7,467,718 B1 * | 12/2008 | Donohue | 210/464 |
| 7,878,110 B1 * | 2/2011 | Michnik et al. | 99/410 |
| D639,109 S | 6/2011 | Molayem | |
| D640,896 S | 7/2011 | Molayem | |
| D642,421 S | 8/2011 | Difante | |
| D646,525 S | 10/2011 | Molayem | |
| D653,073 S | 1/2012 | Difante | |
| D653,074 S | 1/2012 | Difante | |
| D658,424 S | 5/2012 | Difante | |
| D658,425 S | 5/2012 | Difante | |
| D687,256 S | 8/2013 | Difante | |
| D687,257 S | 8/2013 | Difante | |
| 2004/0216620 A1 | 11/2004 | Quiggins et al. | |
| 2004/0238438 A1 * | 12/2004 | Chen | 210/474 |
| 2005/0205487 A1 * | 9/2005 | Rogers | 210/464 |
| 2006/0254976 A1 * | 11/2006 | Cooper | 210/470 |
| 2008/0121117 A1 * | 5/2008 | Best | 99/339 |
| 2012/0174798 A1 | 7/2012 | Kulikowski | |
| 2012/0240790 A1 | 9/2012 | Difante | |
| 2013/0074702 A1 | 3/2013 | Difante | |
| 2013/0125765 A1 | 5/2013 | Difante | |

OTHER PUBLICATIONS

Non-Final Office Action Dated Jul. 2, 2013 in U.S. Appl. No. 13/200,275.

* cited by examiner

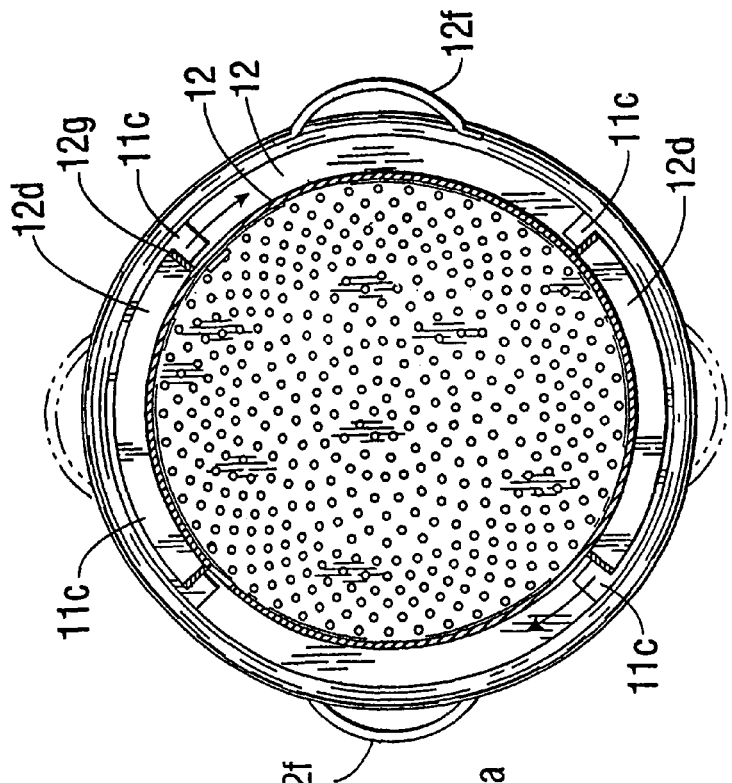
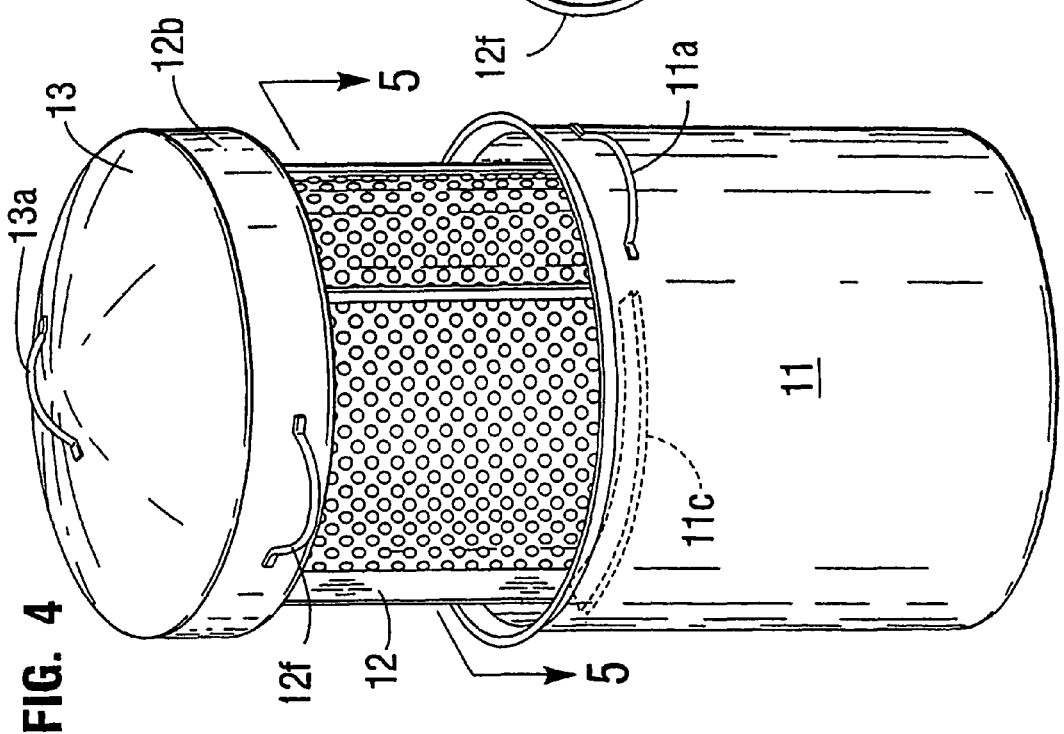

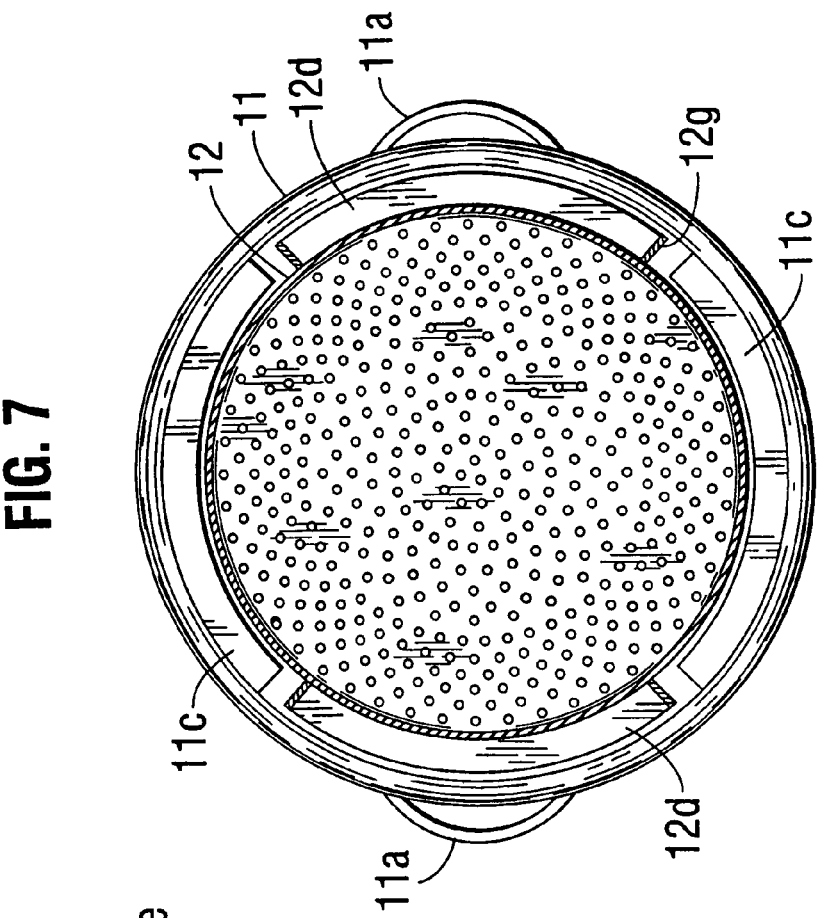
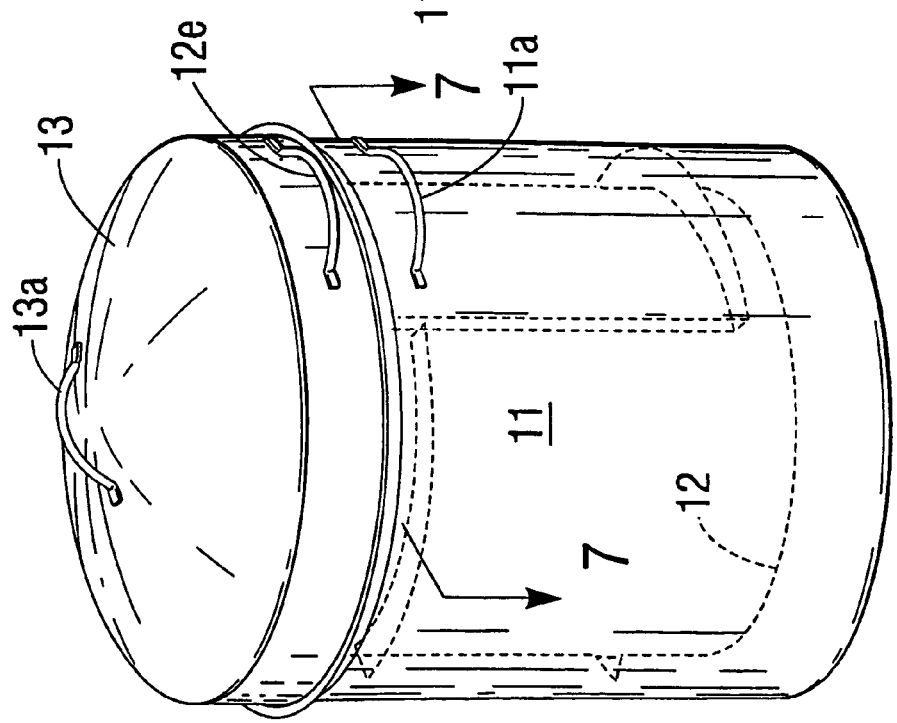

COOKING CONTAINER WITH STRAINER-BASKET

BACKGROUND

The background of the invention will be discussed in two parts.

1. Field of the Invention

The present invention relates in general to apparatus for cooking foods such as pasta and more particularly to a container having liquid to be heated and a cooking strainer-basket, the container and strainer-basket configured with cooperating support members for alternative positioning of the strainer-basket within the container to provide for cooking of the food or for straining of the food.

2. Prior Art

Apparatus for cooking and/or straining of pasta and the like have become commonplace and a variety of such apparatus are known in the art, however, the prior art devices are either too complex or relatively inefficient or uneconomical. A device of interest is shown in U.S. Pat. Des. 353,303 issued to Davis on 13 Dec. 1994 which relates to a combined cooking utensil with lid and strainer. It is a feature of the present invention to provide new and improved cooking apparatus for cooking and for straining of food that is more easy to use, more efficient, safer, and more economical than prior art devices. It is another feature of the invention to provide cooking and straining apparatus that does not require removal of the cooking basket from the container for straining of the food. Other objects of the invention will become apparent with a reading of the specification taken with the drawings wherein there is shown and described the apparatus of the invention.

SUMMARY

The present invention provides apparatus for cooking foods such as pasta and includes a container which receives a liquid, such as water, to be heated and a cooking strainer-basket within the container which is partially submerged in the liquid for cooking, the container and basket configured to have cooperating selectively engaging support members for alternatively positioning of the basket in the water, oil, or other liquid, for cooking of the food and repositioning of the basket above the water, oil, or other liquid to provide for straining of the food.

DRAWINGS

FIG. 4 illustrates the strainer-basket of FIG. 1 positioned above the cooking water with the strainer-basket support members and container support members engaged for straining of the food within the strainer-basket;

FIG. 5 is a top view showing the positioning of the support members of the strainer-basket above the support members of the container allowing for the strainer-basket to be raised and supported at the food straining position within the container;

FIG. 6 illustrates the apparatus of the invention with the support members of the strainer-basket and support members of the container in the open position wherein the strainer-basket is fully inserted into the container and ready for storage or cooking; and FIG. 7 is a top view showing the disengagement, or open, positioning of the support members of the strainer-basket and the support members of the container allowing for the strainer to be lowered into the container.

DESCRIPTION

Figure 1:
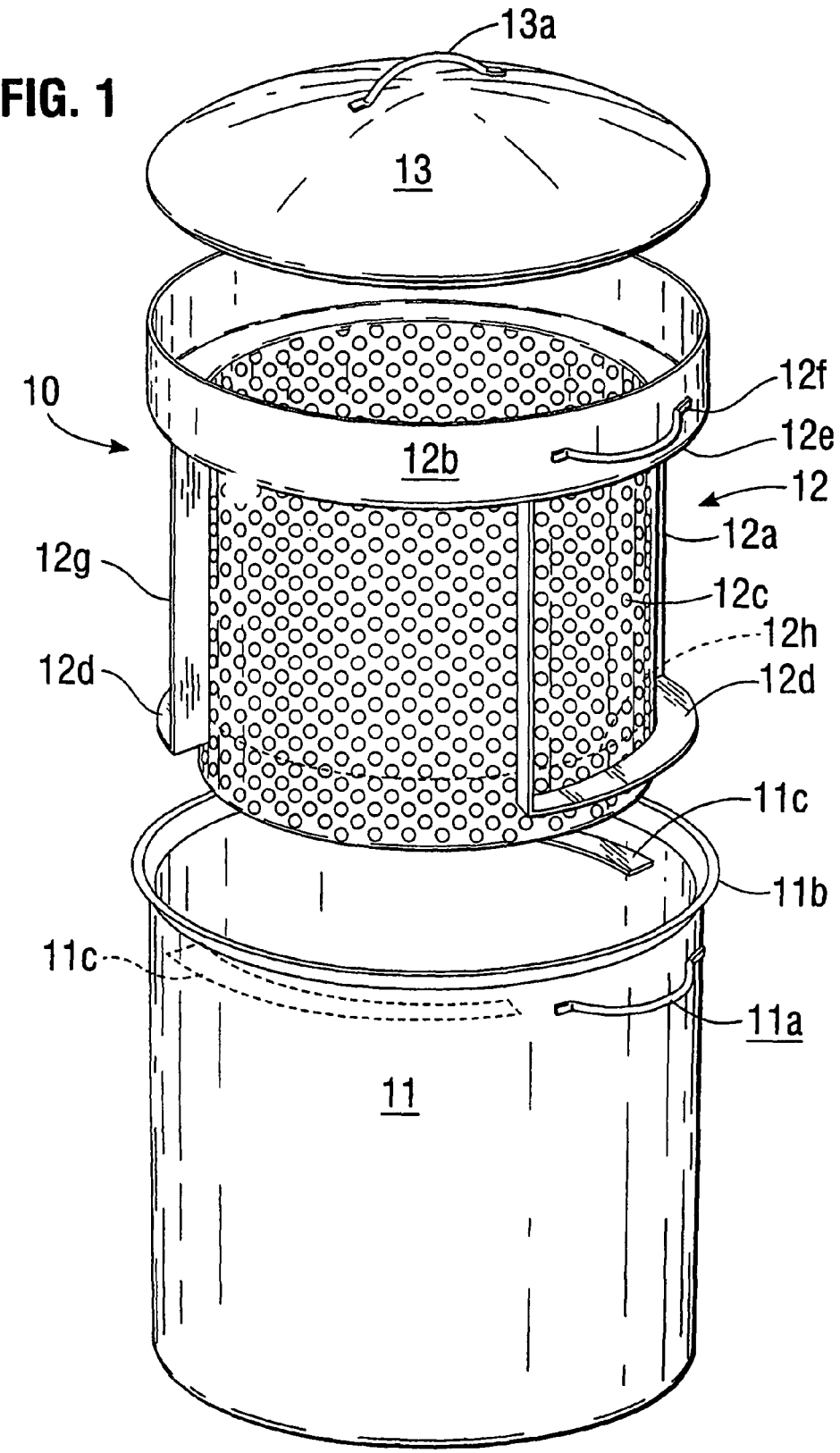
FIG. 1 is an exploded view of the cooking apparatus in accordance with the present invention.

Referring now to the drawings in general, and particularly to FIG. 1, there is shown in exploded view, the cooking apparatus of the invention, generally designated 10. The cooking apparatus 10 includes a circular water container 11, a circular cooking strainer-basket, generally designated 12, having a lower portion 12a with a diameter less than the inside diameter of container 11 for fitting within container 11, and an upper circumferential portion 12b with a diameter greater than the outside diameter of container 11 and configured with a shoulder-like projection extending outwardly from the top of container 11 to restrain insertion of strainer-basket 12 into container 11, and a lid 13 for fitting over the upper portion 12b of strainer-basket 12. Container 11 includes two side handles 11a (one shown), a continuous outwardly extending top lip 11b, and interior selectively positioned container support members 11c. Container support members 11c are selectively spaced intermittently around the interior of the container 11, and extend generally perpendicularly inwardly from the interior wall of container 11. Vertical members 12g provide anti-rotational features for strainer-basket 12. As indicated in dotted lines the bottom 12h of strainer-basket 12 may be recessed upwardly within strainer-basket 12. In this case the bottom 12h is shown recessed above the strainer support members 12d.

Lower portion 12a of strainer-basket 12 includes multiple strainer apertures 12c, and configured with selectively positioned strainer support members 12d (two shown). Strainer support members 12d extend along the exterior lower section of strainer-basket 12. Upper portion 12b includes a circumferentially configured outwardly extending upper portion 12e. Upper portion 12b includes two handles 12f (one shown). Lid 13 includes top handle 13a. Strainer-basket 12 may be rotated such that the strainer support members 12d do not overlay the container support members 11c but disengage to form an opening for strainer-basket 12 to pass into the cooking liquid. Conversely, strainer-basket 12 may be rotated such that strainer support members 12d sufficiently overlay container support members 11c to restrict the opening to prevent passage of strainer-basket 12 and thus provide support for draining of strainer-basket 12.

Figure 2:
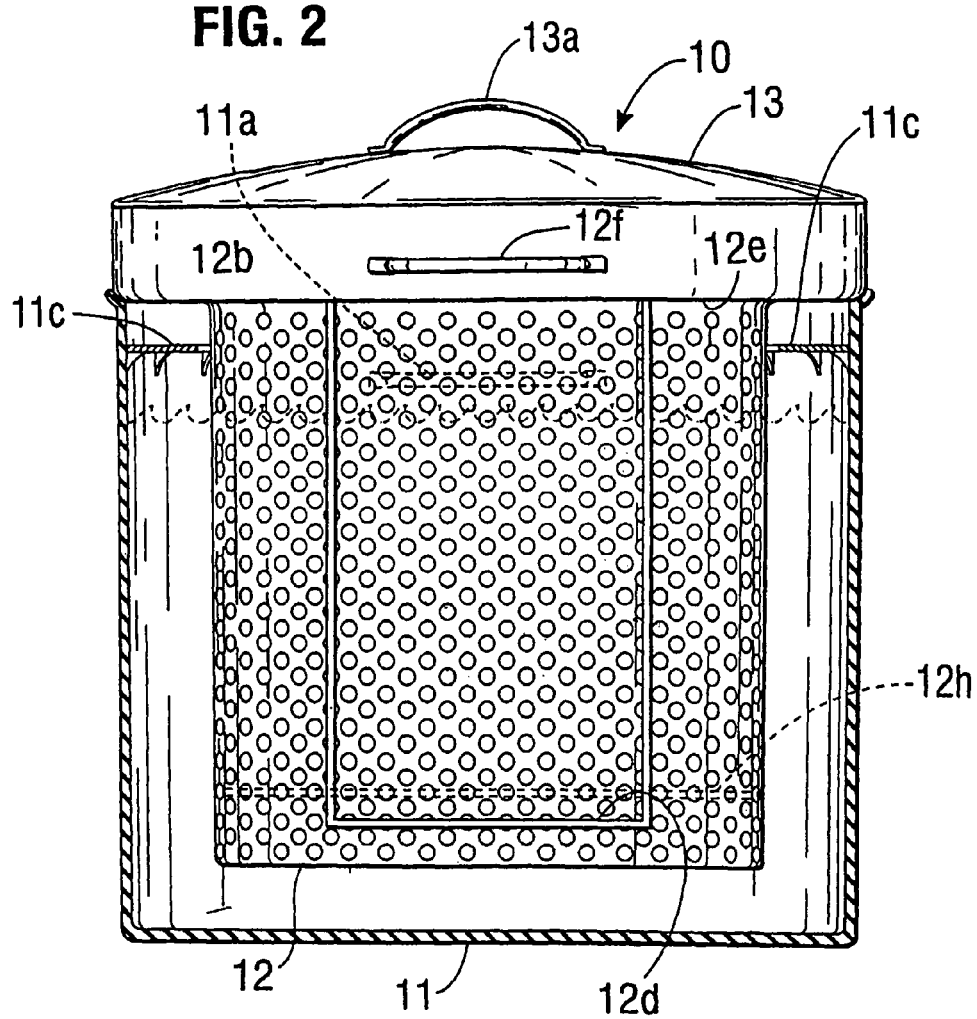
FIG. 2 illustrates in cross-sectional view the cooking strainer-basket of FIG. 1 submerged in water for cooking of food.

FIG. 2 illustrates in cross-sectional view the cooking strainer-basket 12 of FIG. 1 submerged in liquid such as water (indicated by wavy lines) for cooking of food. The container support members 11c of container 11 and the strainer support members 12d of strainer-basket 12 have been disengaged permitting the lower portion 12a of strainer-basket 12 to be inserted into container 11 until the upper portion 12b is sitting within lip 11b of container 11. In this position the food in strainer-basket 12 is submerged for cooking. In this figure it is more clearly seen, in dotted lines, how the bottom 12h may be recessed upwardly within strainer-basket 12. It is to be understood that the position of the strainer-basket 12, the shape and configuration of the strainer-basket 12, the liquid level within the container 11, depth of the strainer-basket 12, and location of the container 11 and strainer-basket 12 support members 12d and container 11 configuration and shape of the support members 11c, may be varied within the scope of the invention.

Figure 3A:
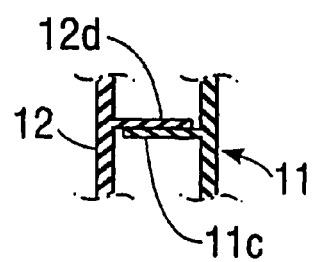
FIG. 3A illustrates one configuration of the engagement of the container support members with the support members of the strainer-basket.
Figure 3B:
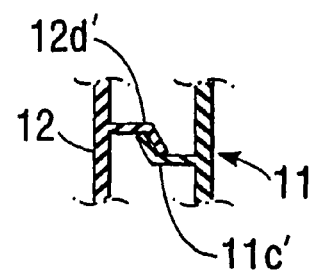
FIG. 3B illustrates another configuration of the engagement of the container support members with the support members of the strainer-basket.

FIG. 3A and 3B illustrate different configurations of the support members for engagement of container 11 with strainer-basket 12. In the FIG. 3A configuration the support members 11c and 12d are both shown to extend perpendicularly from the container 11 and strainer-basket 12, respectively. FIG. 3B illustrates another configuration of the engagement of the container 11 with strainer-basket 12 wherein the support members 11c' and 12d' are shown to have interlocking ends for positioning engagement of the container 11 and strainer-basket 12.

FIG. 4 shows strainer-basket 12 positioned in the food straining position above the liquid in container 11. As indicated by the arrows 5, strainer-basket 12 has been positioned to engage strainer support members 12d of strainer-basket 12 and container support members 11c of container 11. That is, strainer support members 12d are rotated into a position wherein the strainer support members overlay the container support members 11c so as to restrict the opening to thereby prevent passage of strainer-basket 12, and thus provide support for draining of strainer-basket 12.

FIG. 5 is a top view showing the positioning of the support members 12d of strainer-basket 12 above the support members 11c of the container 11 allowing for the strainer-basket 12 to be raised to and supported at the food straining position within the container 11.

FIG. 6 illustrates the apparatus of the invention with the strainer support members 12d of strainer-basket 12 and container support members 11c of container 11 in the open position and disengaged wherein strainer-basket 12 is fully inserted into container 11 until the upper portion 12b is sitting on lip 11b of container 11. In this manner the apparatus of the invention is closed for cooking, storage or transport.

FIG. 7 is a top view of the apparatus 10 of the invention with the lid 13 removed to show the open, or disengaged, positioning of the strainer support members 12d of strainer-basket 12 and the container support members 11c of container 11, thus allowing strainer-basket 12 to be inserted fully into container 11. In this position the upper portion 12b is sitting within lip 11b of container 11.

While the principles of the invention have been described and illustrated in a single embodiment, it will be obvious to those skilled in the art that many modifications of structure, arrangement, proportions, materials, and shape of components used in the practice of the invention can be particularly modified and adapted for specific operating requirements without departing from these principles.

What is claimed is:

1. Food cooking apparatus comprising:
   a container having a side wall and an inner diameter;
   container support members extending inwardly from the container side wall;
   a strainer-basket having a side wall and at least a lower portion that has an outer diameter smaller than the inner diameter of the container;
   rotation-limiting abutment surfaces which extend vertically on the strainer-basket side wall at spaced-apart locations, said abutment surfaces being sized and located relative to the container support members such that the strainer-basket may be rotationally oriented so that the container support members are in alignment with areas between adjacent ones of the abutment surfaces and then lowered vertically to a submersed position within the container, wherein the submersed position is suitable for cooking food contained in the strainer-basket and wherein the container support members continue to be positioned in areas between adjacent ones of the abutment surfaces after the strainer-basket has been fully lowered to the submersed position so that any subsequent rotational movement of the strainer-basket while in the submersed position will be limited by abutment of the container support members against the abutment surfaces adjacent thereto; and
   strainer-basket support members extending from the strainer-basket and configured to be restable on the container support members;
   the strainer-basket being moveable from said submersed position to a draining position by a) vertically lifting the strainer-basket to a raised position where the container support members are no longer in the areas between the rotation-limiting abutment surfaces, b) rotating the strainer-basket to a position where the strainer-basket support members are aligned with the container support members and then c) lowering the strainer-basket to a position where the strainer-basket support members rest upon the container support members, thereby supporting the strainer-basket in a draining position wherein liquid will drain from the strainer-basket into the container.

2. A food cooking apparatus according to claim 1 wherein the container support members comprise horizontally oriented flanges which extend inwardly from the container side wall.

3. A food cooking apparatus according to claim 2 wherein the strainer-basket support members comprise horizontally oriented flanges which extend outwardly from the strainer-basket side wall.

4. A food cooking apparatus according to claim 1 wherein the rotation-limiting abutment surfaces comprise vertically oriented flanges extending outwardly from the strainer-basket side wall.

5. A food cooking apparatus according to claim 1 wherein the container has a top rim and the strainer-basket comprises an upper portion and a lower portion;
   wherein the lower portion of the strainer-basket has said outer diameter that is smaller than the inner diameter of the container and wherein the upper portion of the strainer-basket has a larger outer diameter such that the upper portion of the strainer-basket rests on the top rim of the container when the strainer-basket is lowered to said submersed position within the container.

6. A food cooking apparatus according to claim 5 wherein the top rim of the container comprises an outwardly extending lip.

7. A method for cooking food using a food cooking apparatus according to claim 1, said method comprising the steps of:
   placing a quantity of liquid in the container;
   inserting the strainer-basket to the submersed position within the container;
   heating the cooking liquid;
   placing food in the strainer-basket and cooking the food; and
   moving the strainer-basket from the submersed position to the draining position and allowing the food to drain.

8. A method according to claim 7 wherein inserting the strainer-basket to the submersed position within the container comprises a) orienting the strainer-basket so that the container support members are below and vertically aligned with areas between the rotation-limiting abutment surfaces and then b) lowering the strainer-basket into the container so that the container support members reside between the rotation-limiting abutment surfaces and at least a portion of the strainer-basket is submersed in the liquid.

9. A method according to claim 7 wherein moving of the strainer-basket from the submersed position to the draining position comprises a) lifting the strainer-basket to a position where the container support members are no longer between the rotation-limiting abutment surfaces, b) rotating the strainer-basket to a position where the strainer-basket support members are aligned with the container support members and then c) lowering the strainer-basket to a position where the strainer-basket support members rest upon the container support members and the strainer-basket is thereby supported above the liquid within the container so that liquid will drain from the strainer-basket into the container such that it combined with the liquid in the container.

10. A method according to claim 7 wherein the liquid comprises water.

11. A method according to claim 7 wherein the liquid comprises oil.

* * * * *